(12) United States Patent
Phulwani et al.

(10) Patent No.: US 9,524,041 B2
(45) Date of Patent: Dec. 20, 2016

(54) TOUCH SENSOR GESTURE RECOGNITION FOR OPERATION OF MOBILE DEVICES

(75) Inventors: Praem Phulwani, Baltimore, MD (US); Rudy Yukich, Columbia, MD (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 13/993,057

(22) PCT Filed: Dec. 22, 2010

(86) PCT No.: PCT/US2010/061786
§ 371 (c)(1),
(2), (4) Date: Jun. 10, 2013

(87) PCT Pub. No.: WO2012/087308
PCT Pub. Date: Jun. 28, 2012

(65) Prior Publication Data
US 2013/0257781 A1  Oct. 3, 2013

(51) Int. Cl.
*G09G 5/00* (2006.01)
*G06F 3/041* (2006.01)
(Continued)

(52) U.S. Cl.
CPC .............. *G06F 3/041* (2013.01); *G06F 3/044* (2013.01); *G06F 3/04847* (2013.01); *G06F 3/04883* (2013.01)

(58) Field of Classification Search
CPC ............ G09G 5/00; G06F 3/033; G06F 3/041; G06F 3/044; G06F 3/0416
See application file for complete search history.

(56) References Cited

U.S. PATENT DOCUMENTS

2003/0146899 A1* 8/2003 Sakurai ............... G06F 3/03547
345/156
2004/0252109 A1  12/2004 Trent, Jr. et al.
(Continued)

OTHER PUBLICATIONS

International Search Report and Written Opinion for PCT Patent Application No. PCT/US2010/061786 Mailed Sep. 30, 2011, 11 Pages.
(Continued)

*Primary Examiner* — Temesghen Ghebretinsae
*Assistant Examiner* — Paras D Karki
(74) *Attorney, Agent, or Firm* — Blakely, Sokoloff, Taylor & Zafman LLP (57) ABSTRACT

Touch sensor gesture recognition for operation of mobile devices. An embodiment of a mobile device may include a touch sensor for the detection of gestures, the touch sensor including sensor elements to generate touch sensor data for a detected gesture, and a processor to process the touch sensor data produced by the sensor elements of the touch sensor. In some embodiments the processor is to process the touch sensor data using a hybrid touch sensor algorithm, the hybrid touch sensor algorithm including a plurality of touch sensor algorithms, the plurality of touch sensor algorithms including a first algorithm and a second algorithm, where the processor dynamically changes between the plurality of algorithms depending on of the nature of the received touch sensor data. In some embodiments the processor utilizes a support vector machine with a radial basis function kernel in the interpretation of detected gestures. In some embodiments, the processor is to determine an alignment between a first input sequence of sensor data and a second input sequence of sensor data using dynamic time warping.

18 Claims, 9 Drawing Sheets

(51) Int. Cl.
*G06F 3/033* (2013.01)
*G06F 3/044* (2006.01)
*G06F 3/0484* (2013.01)
*G06F 3/0488* (2013.01)

(56) References Cited

U.S. PATENT DOCUMENTS

| | | | | |
|---|---|---|---|---|
| 2005/0052427 | A1* | 3/2005 | Wu | G06F 3/04883 345/173 |
| 2008/0309630 | A1* | 12/2008 | Westerman | G06F 3/0418 345/173 |
| 2010/0097329 | A1* | 4/2010 | Simmons | G06F 3/0416 345/173 |
| 2010/0097349 | A1* | 4/2010 | Kim | G06F 3/042 345/175 |
| 2010/0117961 | A1* | 5/2010 | Westerman | G06F 3/03543 345/163 |
| 2010/0201631 | A1 | 8/2010 | Taylor et al. | |
| 2010/0289754 | A1* | 11/2010 | Sleeman | G06F 3/0416 345/173 |
| 2010/0315337 | A1 | 12/2010 | Ferren et al. | |
| 2010/0315356 | A1 | 12/2010 | Ferren et al. | |
| 2011/0007021 | A1* | 1/2011 | Bernstein | G06F 3/0416 345/174 |
| 2012/0236388 | A1* | 9/2012 | De Wind | B60R 1/04 359/267 |

OTHER PUBLICATIONS

Yuan, Y. et al, Hybrid Feature Selection for Gesture Recognition Using Support Vector Machines, In: IEEE International Conference on Acoustics, Speech and Signal Processing 2008 (ICASSP 2008), Las Vegas, USA, Mar. 31, 2008-Apr. 4, 2008. pp. 1941-1944.

* cited by examiner

TOUCH SENSOR GESTURE RECOGNITION FOR OPERATION OF MOBILE DEVICES

TECHNICAL FIELD

Embodiments of the invention generally relate to the field of electronic devices and, more particularly, to a method and apparatus for touch sensor gesture recognition for operation of mobile devices.

BACKGROUND

Mobile devices, including cellular phones, smart phones, mobile Internet devices (MIDs), handheld computers, personal digital assistants (PDAs), and other similar devices, provide a wide variety of applications for various purposes, including business and personal use.

A mobile device requires one or more input mechanisms to allow a user to input instructions and responses for such applications. As mobile devices become smaller yet more full-featured, a reduced number of user input devices (such as switches, buttons, trackballs, dials, touch sensors, and touch screens) are used to perform an increasing number of application functions.

However, conventional input devices are limited in their ability to accurately reflect the variety of inputs that are possible with complex mobile devices. Conventional device inputs may respond inaccurately or inflexibly to inputs of users, thereby reducing the usefulness and user friendliness of mobile devices.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to touch sensor gesture recognition for operation of mobile devices.

As used herein:

"Mobile device" means a mobile electronic device or system including a cellular phone, smart phone, mobile Internet device (MID), handheld computers, personal digital assistants (PDAs), and other similar devices.

"Touch sensor" means a sensor that is configured to provide input signals that are generated by the physical touch of a user, including a sensor that detects contact by a thumb or other finger of a user of a device or system.

In some embodiments, a mobile device includes a touch sensor for the input of signals. In some embodiments, the touch sensor includes a plurality of sensor elements. In some embodiments, a method, apparatus, or system provides for:

(1) A hybrid centroid-slider touch sensor algorithm.

(2) Abstract feature classification using a Support Vector Machine (SVM) for gesture recognition.

(3) Gesture recognition based on sequence classification via dynamic time warping.

In some embodiments, a mobile device includes an instrumented surface designed for manipulation via a finger of a mobile user. In some embodiments, the mobile device includes a sensor on a side of a device that may especially be accessible by a thumb (or other finger) of a mobile device user. In some embodiments, the surface of a sensor may be designed in any shape. In some embodiments, the sensor is constructed as an oblong intersection of a saddle shape. In some embodiments, the touch sensor is relatively small in comparison with the thumb used to engage the touch sensor.

In some embodiments, instrumentation for a sensor is accomplished via the use of capacitance sensors and/or optical or other types of sensors embedded beneath the surface of the device input element. In some embodiments, these sensors are arranged in one of a number of possible patterns in order to increase overall sensitivity and signal accuracy, but may also be arranged to increase sensitivity to different operations or features (including, for example, motion at an edge of the sensor area, small motions, or particular gestures). Many different sensor arrangements for a capacitive sensor are possible, including, but not limited to, the sensor arrangements illustrated in FIG. 2 below.

In some embodiments, sensors include a controlling integrated circuit that is interfaced with the sensor and designed to connect to a computer processor, such as a general-purpose processor, via a bus, such as a standard interface bus. In some embodiments, sub-processors are variously connected to a computer processor responsible for collecting sensor input data, where the computer processor may be a primary CPU or a secondary microcontroller, depending on the application. In some embodiments, sensor data may pass through multiple sub-processors before the data reaches the processor that is responsible for handling all sensor input.

Figure 1:
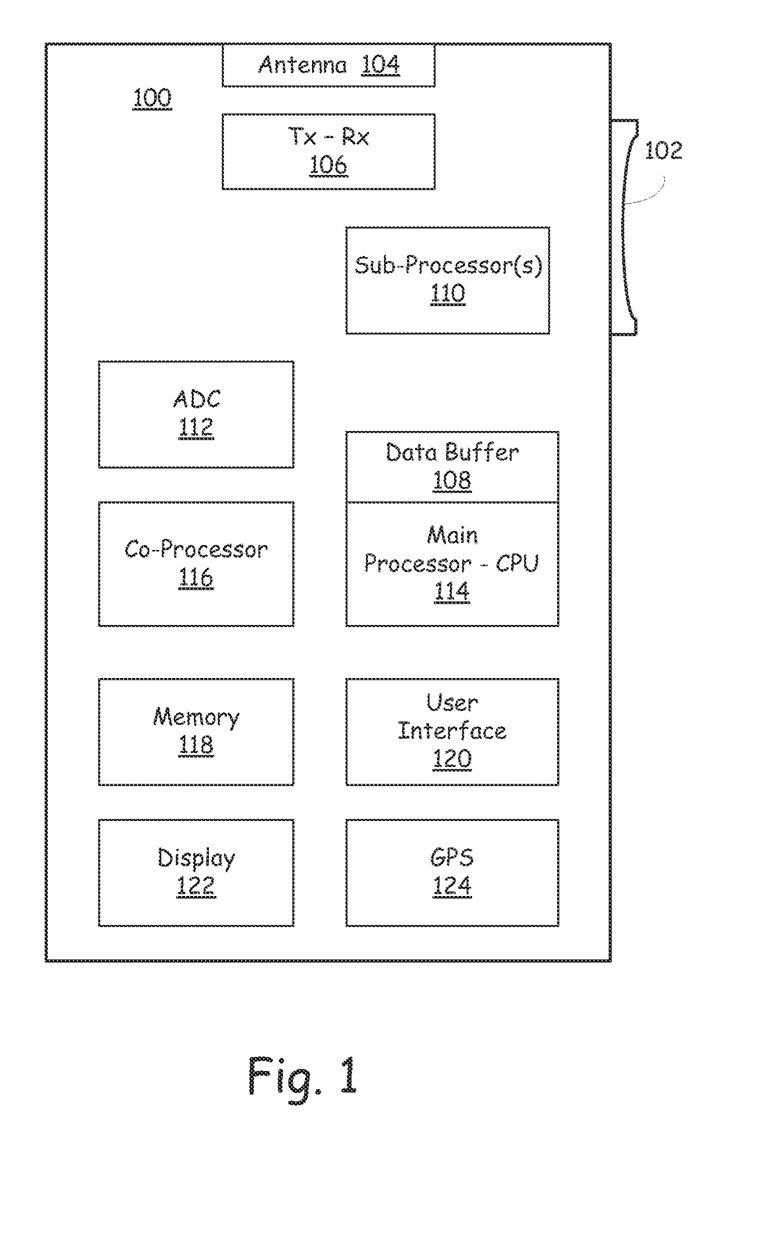
FIG. 1 is an illustration of an embodiment of a mobile device.

FIG. 1 is an illustration of an embodiment of a mobile device. In some embodiments, the mobile device 100 includes a touch sensor 102 for input of commands by a user using certain gestures. In some embodiments, the touch sensor 102 may include a plurality of sensor elements. In some embodiments, the plurality of sensor elements includes a plurality of capacitive sensor pads. In some embodiments, the touch sensor 102 may also include other sensors, such as an optical sensor. See, U.S. patent application Ser. No. 12/650,582, filed Dec. 31, 2009 (Optical Capacitive Thumb Control With Pressure Sensor); U.S. patent application Ser. No. 12/646,220, filed Dec. 23, 2009 (Contoured Thumb Touch Sensor Apparatus). In some embodiments, raw data is acquired by the mobile device 100 from one or more sub-processors 110 and the raw data is collected into a data buffer 108 of a processor, such as main processor (CPU) 114 such that all sensor data can be correlated with each sensor in order to process the signals. The device may also include, for example, a coprocessor 116 for computational processing. In some embodiments, an example multi-sensor system utilizes an analog to digital converter (ADC) element or circuit 112, wherein the ADC 112 may be designed for capacitive sensing in conjunction with an optical sensor designed for optical flow detection, wherein both are connected to the main processor via different busses. In some embodiments, the ADC 112 is connected via an I2C bus and an optical sensor is connected via a USB bus. In some embodiments, alternative systems may include solely the ADC circuit and its associated capacitive sensors, or solely the optical sensor system.

In some embodiments, in a system in which data is handled by a primary CPU 114, the sensor data may be acquired by a system or kernel process that handles data input before handing the raw data to another system or kernel process that handles the data interpretation and fusion. In a microcontroller or sub-processor based system, this can either be a dedicated process or timeshared with other functions.

The mobile device may further include, for example, one or more transmitters and receivers 106 for the wireless transmission and reception of data, as well as one or more antennas 104 for such data transmission and reception; a memory 118 for the storage of data; a user interface 120, including a graphical user interface (GUI), for communications between the mobile device 100 and a user of the device; a display circuit or controller 122 for providing a visual display to a user of the mobile device 100; and a location circuit or element, including a (GPS) circuit or element 124.

In some embodiments, raw data is time tagged as it enters into the device or system with sufficient precision so that the raw data can both be correlated with data from another sensor, and so that any jitter in the sensor circuit or acquisition system can be accounted for in the processing algorithm. Each set of raw data may also have a pre-processing algorithm that accounts for characteristic noise or sensor layout features which need to be accounted for prior to the general algorithm.

In some embodiments, a processing algorithm then processes the data from each sensor set individually and (if more than one sensor type is present) fuses the data in order to generate contact, position information, and relative motion. In some embodiments, relative motion output may be processed through a ballistics/acceleration curve to give the user fine control of motion when the user is moving the pointer slowly. In some embodiments, a separate processing algorithm uses the calculated contact and position information along with the raw data in order to recognize gestures. In some embodiments, gestures that the device or system may recognize include, but are not limited to: finger taps of various duration, swipes in various directions, and circles (clockwise or counter-clockwise). In some embodiments, a device or system includes one or more switches built into a sensor element or module together with the motion sensor, where the sensed position of the switches may be directly used as clicks in control operation of the mobile device or system.

In some embodiments, the output of processing algorithms and any auxiliary data is available for usage within a mobile device or system for operation of user interface logic. In some embodiments, the data may be handled through any standard interface protocol, where example protocols are UDP (User Datagram Protocol) socket, Unix™ socket, D-Bus (Desktop Bus), and UNIX/dev/input device.

Figure 2:
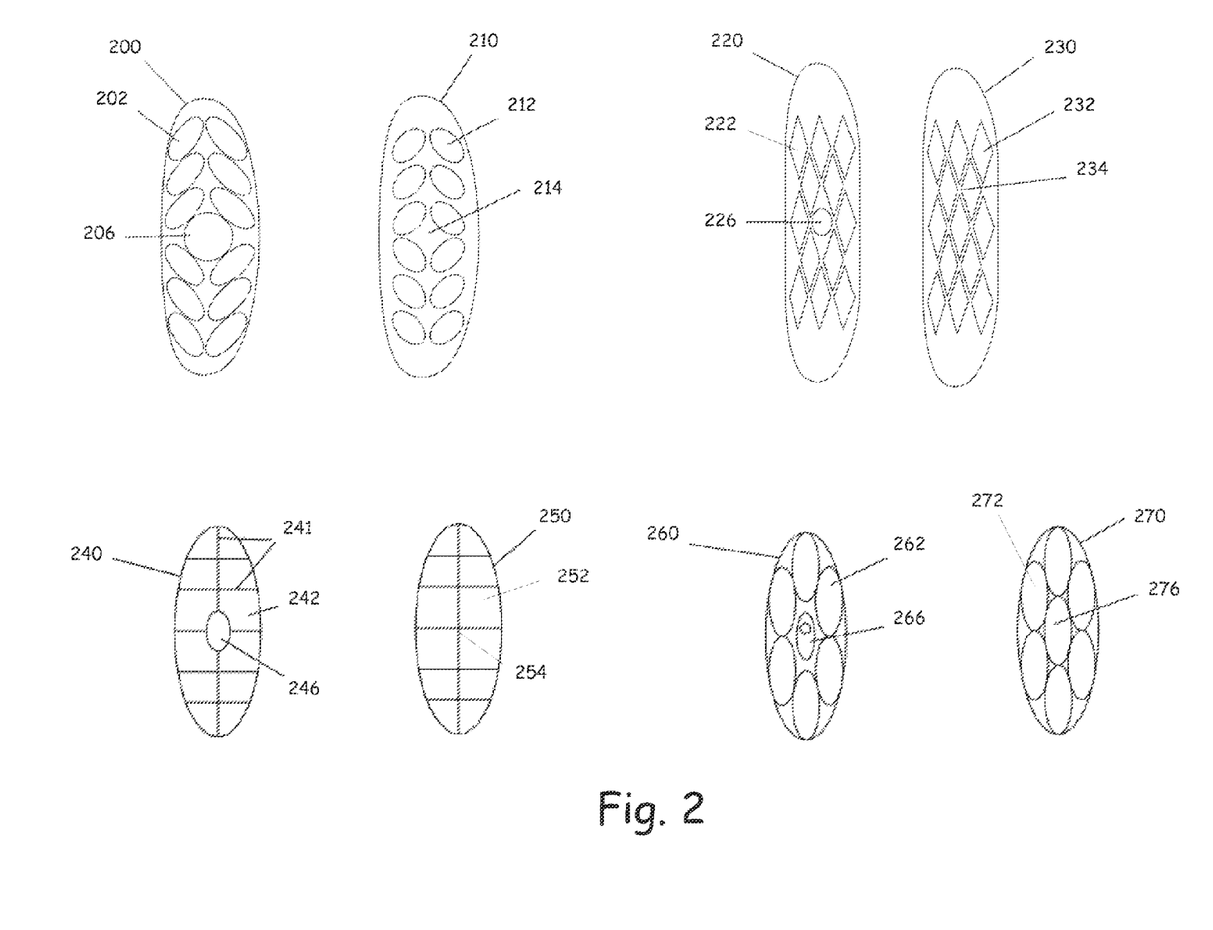
FIG. 2 is an illustration of embodiments of touch sensors that may be included in a mobile device.

FIG. 2 is an illustration of embodiments of touch sensors that may be included in a mobile device. In some embodiments, a touch sensor may include any pattern of sensor elements, such as capacitive sensors, that are utilized in the detection of gestures. In some embodiments, the touch sensor may include one or more other sensors to assist in the detection of gestures, including, for example, an optical sensor.

In this illustration, a first touch sensor 200 may include a plurality of oval capacitive sensors 202 (twelve in sensor 200) in a particular pattern, together with a centrally placed optical sensor 206. A second sensor 210 may include similar oval capacitive sensors 212 with no optical sensor in the center region 214 of the sensor 210.

In this illustration, a third touch sensor 220 may include a plurality of diamond-shaped capacitive sensors 222 in a particular pattern, together with a centrally placed optical sensor 226. A fourth sensor 230 may include similar diamond-shaped capacitive sensors 232 with no optical sensor in the center region 234 of the sensor 230.

In this illustration, a fifth touch sensor 240 may include a plurality of capacitive sensors 242 separated by horizontal and vertical boundaries 241, together with a centrally placed optical sensor 246. A sixth sensor 250 may include similar capacitive sensors 252 as the fifth sensor with no optical sensor in the center region 254 of the sensor 250.

In this illustration, a seventh touch sensor 260 may include a plurality of vertically aligned oval capacitive sensors 262, together with a centrally placed optical sensor 266. An eighth sensor 270 may include similar oval capacitive sensors 272 with no optical sensor in the center region 276 of the sensor 270.

Figure 3:
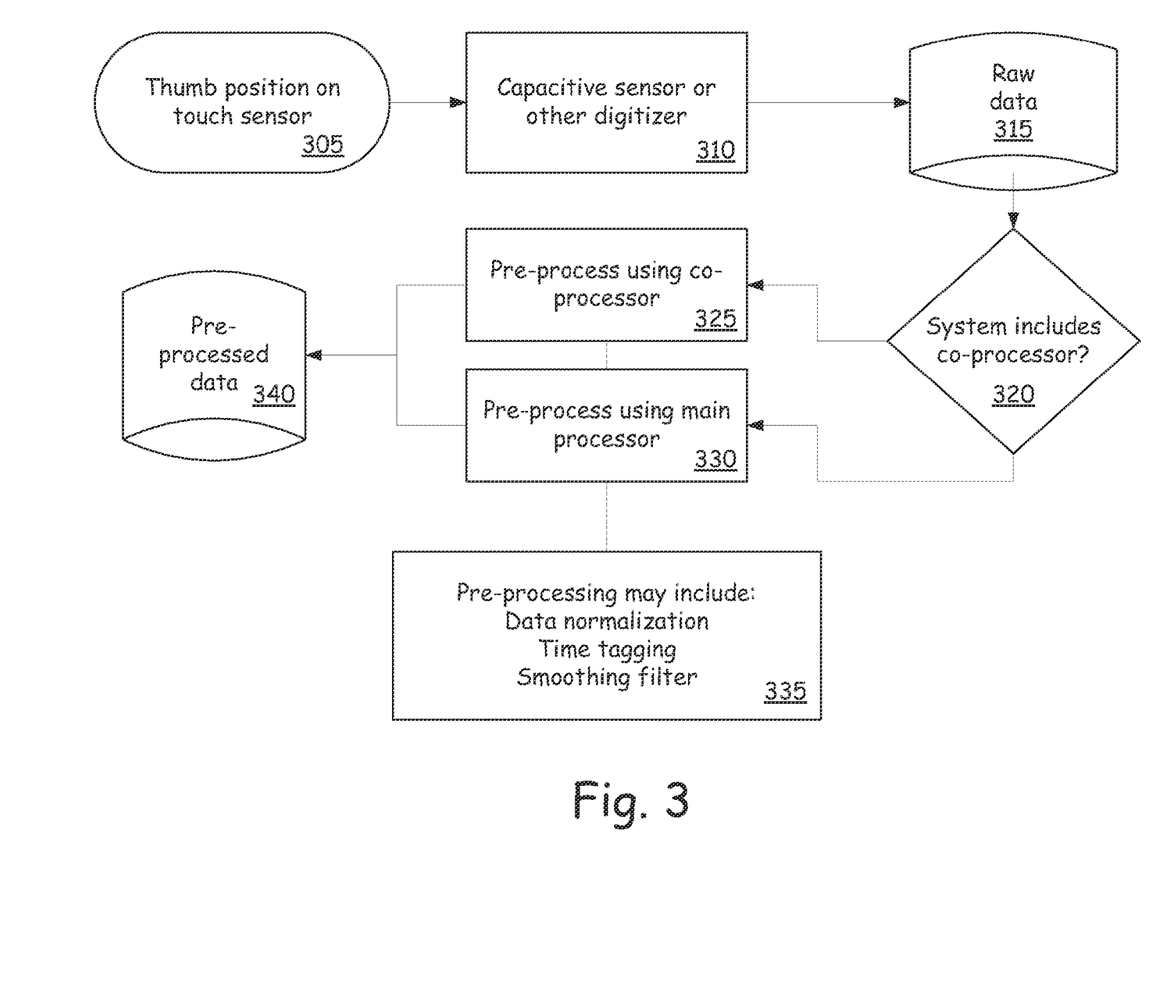
FIG. 3 is an illustration of an embodiment of a process for pre-processing of sensor data.

FIG. 3 is an illustration of an embodiment of a process for pre-processing of sensor data. In this illustration, the position of a thumb or other finger on a sensor 305 results in signals generated by one or more capacitive sensors or other digitizers 310, such signals resulting in a set of raw data 315 for preprocessing. If a system or device includes a co-processor 320, then preprocessing may be accomplished utilizing the co-processor 325. Otherwise, the preprocessing may be accomplished utilizing the main processor of the system or device 330. In either case, the result is a set of preprocessed data for processing in the system or device 340. The preprocessing of the raw data may include a number of functions to transform data into more easily handled formats 335, including, but not limited to, data normalization, time tagging to correlate data measurements with event times, and imposition of a smoothing filter to smooth abrupt changes in values. While preprocessing of raw data as illustrated in FIG. 3 is not provided in the other figures, such preprocessing may apply in the processes and apparatuses provided in the other figures and in the descriptions of such processes and apparatuses.

(1) Hybrid Centroid-Slider Touch Sensor Algorithm

Many capacitive touch sensing surfaces operate based on "centroid" algorithms, which take a weighted average of a quantity derived from the instantaneous capacitance reported by each capacitive sensor pad multiplied by that capacitive sensor pad's position in space. The resulting quantity is a capacitive "barycenter" for the thumb (or other finger) used in controlling a mobile device, where the barycenter may either be treated as the absolute position of the thumb or differentiated to provide relative motion information as would a mouse. The characteristics of a given centroid algorithm are largely determined by scaling and/or normalization of the capacitive data prior to averaging. Approaches may include (a) squared deviation from a per-datum capacitive baseline and (b) normalization by automatically calibrated per-sensor-pad minima and maxima. In the former approach, the per-datum capacitive baseline is determined by tracking the minimal value for each sensor pad, subtracting that from the observed input, and then subtracting the lowest observed sensor pad level in a given observation from all other observed sensor pad levels. Treating these as error terms and squaring them prior to averaging has the effect of projecting the sensor coordinate space onto a quadratic surface. In the latter approach, minima and maxima are determined by observing the range of values for each sensor pad during its operation.

However, for a sensor operated by, for example, a user's thumb (or other finger), the biomechanics of the thumb for providing gestures may lead to an apparent mismatch between the user's expectation of pointer motion and the measured barycenter, where, for example, a user's expectation of pointer motion does not match the motion apparent in the capacitive data. In particular, as the thumb is extended through its full motion, the tip of the thumb lifts away from the surface of the capacitive sensor. In a centroid-based capacitive sensor algorithm, this motion yields an apparent (proximal) shift in the calculated position of the thumb while the user expects that the pointer will continue to track the distal extension of the thumb. Instead of tracking the finger tip, the pointer position determined by a centroid algorithm appears to "roll-back" along the proximodistal axis.

An alternative approach, the "slider" algorithm, operates to exploit the known layout of the sensor pads of a touch sensor, such as the layouts illustrated in FIG. 2, and expected mechanics of the thumb. The algorithm treats the sensor pads as being in ranks arranged perpendicularly to the proximodistal axis of the thumb. At any time, the algorithm locates the distal-most rank that meets some threshold for maximal activation, such as full contact with the thumb. The algorithm then looks forward to the next rank, distally, and calculates its fractional activation versus the threshold for contact. The proximodistal position of the thumb is then determined to be a point between these two ranks, interpolated using the fractional activation of the second rank. Position in the perpendicular axis (along the rank) is calculated as in the centroid algorithm.

However, an issue with the slider approach arises when the pad of the thumb is on the sensor while the tip of the thumb is off to one side of the sensor. This situation may arise, for example, if the user sweeps the user's flat thumb over the sensor surface in a "windshield wiper" motion. Under these conditions, a slider algorithm alone effectively tracks the arc of the thumb's motion while the thumb's tip is within the sensor area. When the tip of the thumb leaves the sensor area, however, the slider calculation becomes unstable. The identification of which sensor rank is maximally activated (which may be referred to as the "rail rank") may oscillate rapidly, thereby producing large discontinuities in the calculated motion of the thumb's tip. This is referred to as "rank skipping" between fully activated sensor pads.

In some embodiments, a method, apparatus, or system provides for determining a contact position on a touch sensor of a mobile device, such as a thumb-operated capacitive touch sensor, to address the deficiencies of stateless and physiologically naïve data perspectives, including deficiencies of centroid and slider approaches. In some embodiments, a mobile device or system utilizes a hybrid slider algorithm that merges the solution of the roll-back problem from a slider algorithm with a centroid algorithm in order to:

(1) Seamlessly track varying input positions, such as both crooked and flat thumb positions; and (2) Detect rank skipping in the slider algorithm, and then fall back to centroid metrics when rank skipping is detected.

In some embodiments, a hybrid algorithm makes use of two algorithmic coordinate spaces. The proximodistal coordinate spaces generated by the two algorithms are registered to one another by linear regression. In some embodiments, once transformed into the centroid coordinate space, the slider algorithm output is used preferentially to the centroid algorithm solution when, for example, the thumb tip is located on an upper portion of the touch sensor. In an example, the slider algorithm output may generally be used preferentially to the centroid algorithm solution when the thumb tip of a user is located on the upper two-thirds of the sensor. In some embodiments, the centroid output is always used for position on the axis perpendicular to the thumb's anticipated axis of extension.

In some embodiments, to detect rank-skipping, the algorithm matches a large first derivative of position in the slider coordinate space along the proximodistal axis with no corresponding change in the centroid coordinate space. When this occurs, the algorithm updates the calculated position of the finger by the change in centroid position, rather than using the centroid position directly. In some embodiments, this relative updating continues until the thumb tip returns to the lateral (aligned along the rank) center of the sensor, at which point the proximodistal position can be reliably calculated from the slider algorithm. In some embodiments, the relative and absolute motion information generated by this hybrid approach is then filtered using a smoothing filter. In an example, filtering may be accomplished using a second order, fifteen tap Savitzky-Golay smoother centered at the fifth most recent sample to provide fine cursor control while maintaining high-frequency features of thumb motion for use in gesture recognition.

Figure 4:
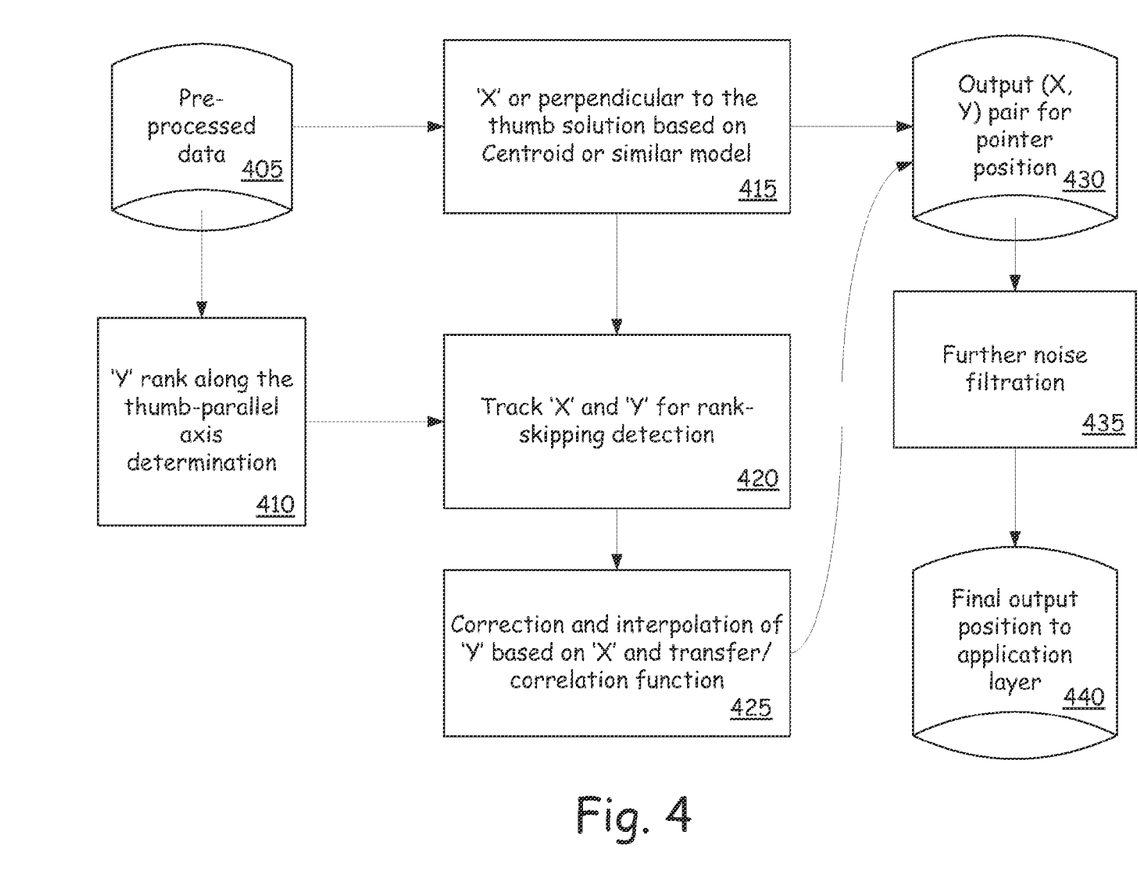
FIG. 4 is an illustration of an embodiment of processing data using a hybrid gesture interpretation algorithm.

FIG. 4 is an illustration of an embodiment of processing data using a hybrid touch sensor algorithm. In some embodiments, the hybrid touch sensor algorithm is utilized to remedy deficiencies of centroid and slider algorithms as described above. In some embodiments, X and Y positions may be determined by both centroid and slider algorithms. A property of the two algorithms is that the X position is a linear transformation between the spaces, allowing for discarding one of the values in practice. In some embodiments, the slider coordinates are transformed into centroid space prior to hybridization, and thus the centroid may be used for the X position to avoid the computational cost of an unnecessary linear transform. In some embodiments, sensor data including pre-processed data 405, such as pre-processed data 340 generated as indicated in FIG. 3, is used to determine the 'Y' rank along a thumb-parallel axis. The pre-processed data 405 is also used to determine a position for the 'X' axis, where the 'X' axis is perpendicular to the thumb axis, where in some embodiments the position is based on a centroid or other similar model 415.

In some embodiments, the process or device utilizes the 'X' and 'Y' position information to detect rank-skipping 420. In some embodiments, rank skipping is detected when (1) a large derivative in the slider Y position has no counterpart in the centroid Y position; and (2) the X position is close enough to the edge of the sensor for rank skipping to manifest itself. In some embodiments, the process or device provides for correction and interpolation of 'Y' based on 'X' for a transfer/correlation function 425. In some embodiments, the function is an empirically determined linear transformation from slider to centroid coordinate space.

The 'X' values and the corrected and interpolated 'Y' values provide for an output pair (X,Y) for the pointer position 430. In some embodiments, the process or device may provide for further noise filtering 435, and provide the final position data to the application layer 440. In some embodiments, the position data may be provided to a gesture identification algorithm, including, for example, algorithms described below.

Figure 5:
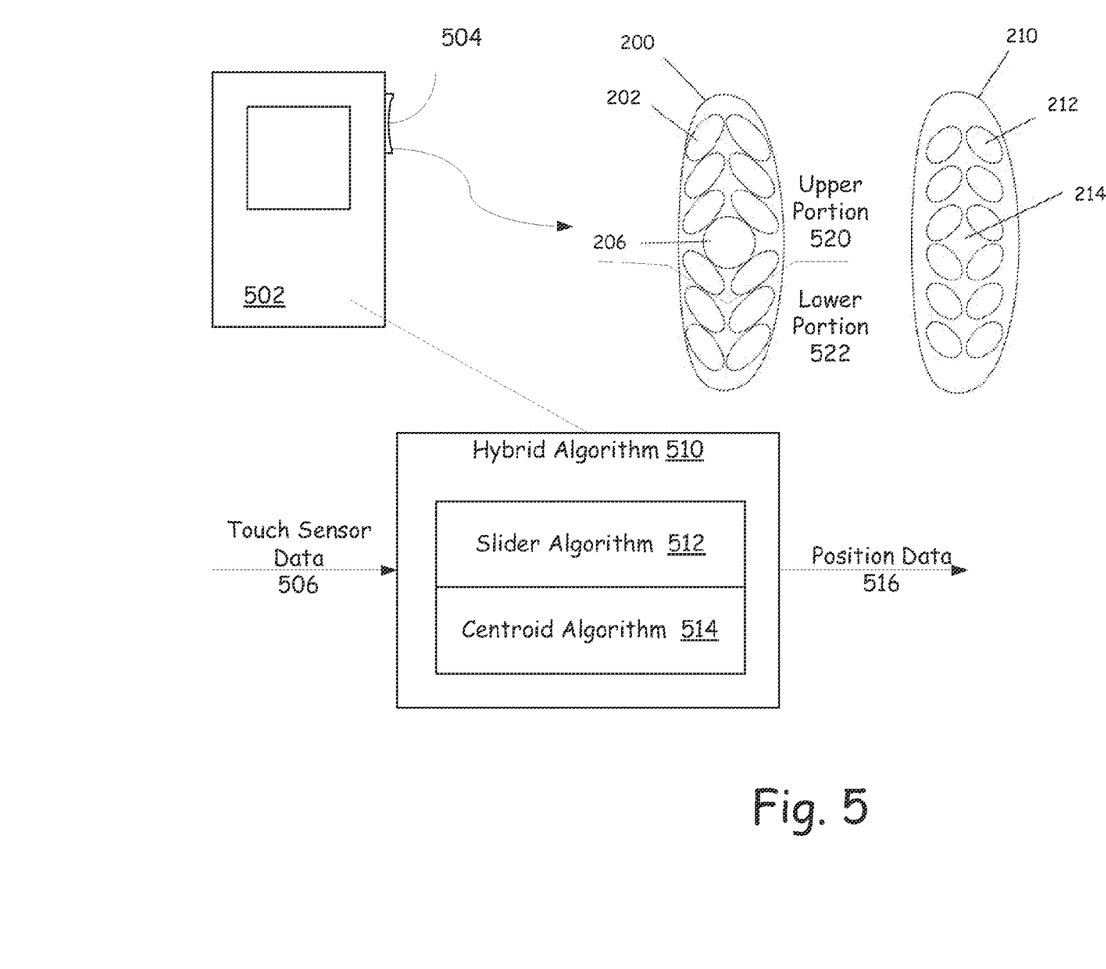
FIG. 5 is an illustration of an embodiment of mobile device using a hybrid gesture interpretation algorithm.

FIG. 5 is an illustration of an embodiment of mobile device using a hybrid touch sensor algorithm. A mobile device 502, which may be the mobile device 100 illustrated in FIG. 1, includes a touch sensor 504 for input of gestures, such as by movement of a thumb on such sensor. The touch sensor may include a sensor such as the examples illustrated in FIG. 2. In one particular example, the touch sensor 504 may be a first touch sensor 200 including a plurality of oval capacitive sensor pads 202 in a particular pattern, together with a centrally placed optical sensor 206, or a similar second sensor 210 with oval capacitive sensor pads 212 and no optical sensor in the center region 214 of the sensor 210. However, embodiments are not limited to any particular touch sensor structure or pattern.

In some embodiments, the mobile device 502 may utilize a hybrid touch sensor algorithm 510 for the processing of touch sensor data 506. In some embodiments, the hybrid algorithm includes multiple algorithms, including a slider algorithm 512 and a centroid algorithm 514, wherein the algorithm utilized in processing varies depending on the circumstances of gesture detection and the data received. In some embodiments, one of the algorithms is preferred in certain circumstances, such as the slider algorithm 512 being used preferentially to the centroid algorithm solution when, for example, the thumb tip is located on an upper portion of the touch sensor. In this illustration, an upper portion 520 and a lower portion 522 of the touch sensor are illustrated. In some embodiments, processing will switch or fall back to use of one of the algorithms, such as the centroid algorithm 514, when rank skipping is detected in the other algorithm, the slider algorithm in this case. In some embodiments, the switching includes using a transformation of the calculated position using the centroid algorithm when rank skipping has been detected. In some embodiments, data regarding the determined position of detected gestures 516 is produced by the hybrid algorithm, where such position data may be used in the interpretation of the detected gestures.

(2) Abstract Feature Classification Using a SVM for Gesture Recognition

Gestures made in connection with a mobile device, while having differing durations and possibly being made over different parts of the sensor of the mobile device, may have similar properties when integrated in the time domain. Examples of these properties include initial, medial, and terminal positions, mean and maximal velocities, and RMS capacitance over the entire sensor surface. While a priori understanding of the use of these properties in classification is generally unavailable, such properties may form a diagnostic set of properties for gesture recognition on a touch sensor.

A touch sensor interface on a mobile device, such as the touch sensor 102 illustrated in FIG. 1 with a surface as illustrated by the embodiments shown in FIG. 2, may pose certain gesture recognition challenges that are atypical of other gesture recognition applications, including:

(1) The manipulator of the touch sensor (i.e., the thumb or finger of the user) is larger than the touch sensor.

(2) The surface of the touch sensor is a compound-curve, and thus motion that appears to the user to be linear actually exhibits significant curvature.

(3) The finger-parallel and finger-perpendicular axes have significantly different resolutions.

These factors may thus make it difficult to make accurate a priori assumptions about the behavior of motion data through any given gesture. In some embodiments, the lack of good a priori assumptions about the data makes machine-learning techniques particularly appropriate for gesture recognition for a touch sensor.

In some embodiments, a machine-learning technique is provided for use as a gesture recognition system for a touch sensor. In some embodiments, gesture processing algorithms for a touch sensor operated by a user's thumb (or other finger) are utilized to match the observed sensor readings to a set of gestures. For example, typical gestures may include: thumb taps of various duration, swipes in various directions, and circles (clockwise or counter-clockwise). Many different algorithms are possible, where such potential algorithms may be simple, such as using a primary direction accumulation versus total contact time with the touch sensor, or complex, such as neural networks and other machine-learning techniques.

In some embodiments, a mobile device recognizes gestures at least in part using a support vector machine (SVM) with a radial basis function (RBF) kernel. Support vector machines are utilized for machine learning classification, and a large family of kernel functions is available for specific problem classes. SVMs are relatively robust trainers and are numerically stable for the most popular kernel functions. In some embodiments, gesture recognition for a touch sensor of a mobile device employs an SVM with a kernel defined by a radial basis function of the form:

$$K(\vec{x}_i, \vec{x}_j) = \phi(\vec{x}_i)^T \phi(\vec{x}_j) = e^{\gamma \|\vec{x}_i - \vec{x}_j\|}, \gamma > 0$$

where $\vec{x}_i, \vec{x}_i$ and $\vec{x}_j$ are abstract feature vectors that each describe a gesture. For each class, feature vectors $\vec{x}_i \in \mathbb{R}^n$ are calculated and associated with membership labels $y_i \in \{-1, 1\}$ such that $(\vec{x}_i, y_i)$, $i \in 1, \ldots, 1$. Then, for all i, minimize over $\vec{w}$, b, and $\xi$ the quantity $$\frac{1}{2}\vec{w}^T\vec{w} + C\sum_{i=1}^{l} \xi_i$$

subject to the constraints $$y_i(\vec{x}^T \phi(\vec{x}_i) + b) \geq 1 - \xi_i$$

$$\xi_i \geq 0.$$

This technique finds separating hyperplanes $(\vec{w}_k, b_k)$ (i.e., support vectors) for each gesture class in the Hilbert space given by the RBF. Hyperplanes are geometric entities in an abstract space, and a support vector is how, given an extant description of that space, a hyperplane is described. Thus, the resulting classifier has the hyperparameters $\gamma$, the RBF kernel parameter, and C, the linear penalty parameter for misclassified samples. Each recognition is relatively low in computational cost because the recognition algorithm need only calculate $\vec{w}_k^T \phi(\vec{x}_{sample}) + b_k$ for each gesture class and then check to see on which side of each separating hyperplane the gesture lies.

A feature space with an RBF kernel is characterized by the two hyperparameters, $\gamma$ and C, whose values are not known a priori. In some embodiments, a grid-search of the hyperparameter space may be made, resulting in a kernel function tailored to the classification problem at hand. It is known that for some hyperparameter choices, an RBF can approximate other popular kernel functions, such as linear and polynomial kernels, so the classifying power of multiple classes of kernels, as well as non-trivial superpositions thereof, are available when using an RBF kernel.

In some embodiments, a classifier may be generated using training and selection of a feature set. In some embodiments, the process is accomplished by grid-searching the hyperparameter space multiple times, while leaving out one feature from classification each time so as to calculate an F-score for each abstract feature, where the higher the F-score for a feature is the more discriminative the feature is. Low F-score features may be deemed to be a source of noise, and thus are discarded. In some embodiments, once such noise sources are discarded, the RBF hyperparameter space is searched with a finer comb to identify a maximally discriminating RBF. In some embodiments, the resulting support vectors are then recorded for use in online gesture classification.

In some embodiments, while a training phase may be computationally intensive, the process may be used to converge quickly on an iterative solution to the problem of calculating separating hyperplanes. In some embodiments, actual gesture recognition during subsequent operation is fast due to the support vectors having been precalculated.

Figure 6:
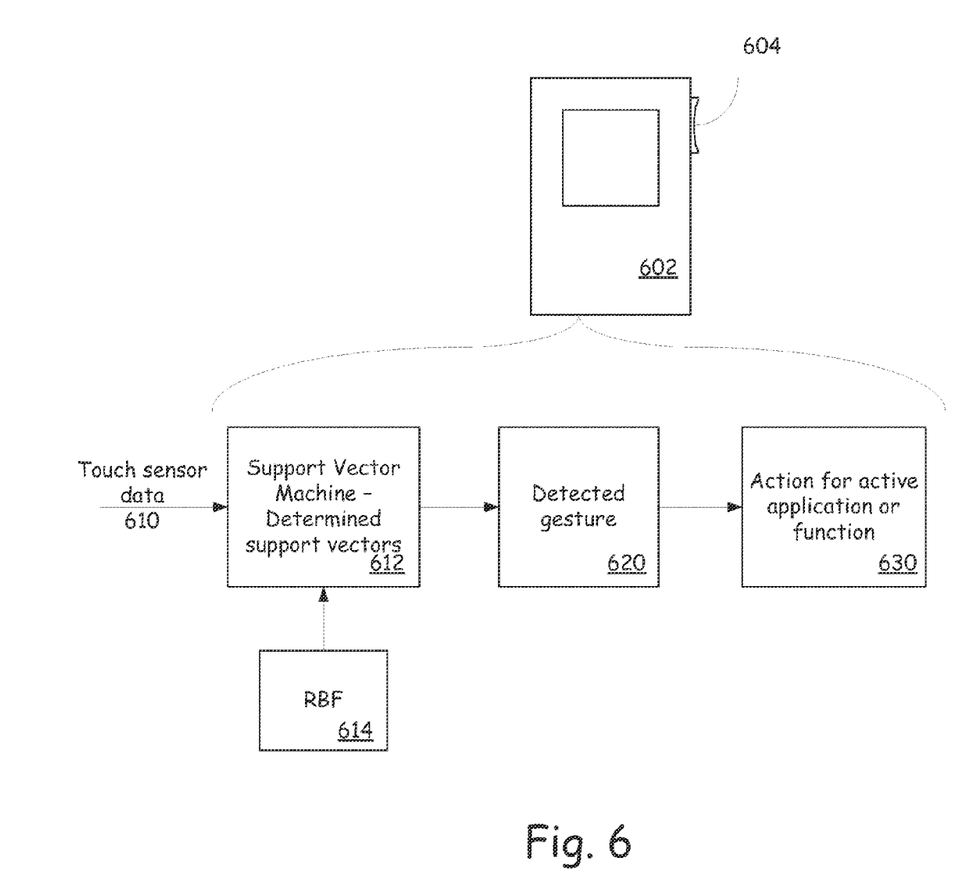
FIG. 6 is an illustration of an embodiment of a mobile device providing for gesture recognition using a support vector machine.

FIG. 6 is an illustration of an embodiment of a mobile device providing for gesture recognition using a support vector machine. In some embodiments, a mobile device 602, such as mobile device 100 illustrated in FIG. 1, includes a touch sensor 604, such as the touch sensors illustrated in FIG. 2. In some embodiments, touch sensor data 610 generated by the touch sensor 604 in connection with a gesture, such as a gesture performed by a thumb of a user on the touch sensor 604, is transformed into feature vectors which are then classified by a support vector machine (SVM) 612 with a radial basis function (RBF) kernel, the RBF being the kernel function (or inner product function) of the feature space and the support vectors defining hyperplanes in that space. In some embodiments, the support vectors are generated in a training phase of the support vector machine. In some embodiments, the use of such support vectors may allow for efficient and accurate detection of a gesture 620, which may then be used to recognize an action to be implemented in the currently active application or function 630 of the mobile device 602. In some embodiments, to recognize a gesture, data is transformed into a feature vector and projected into the Hilbert space. In some embodiments, a process includes checking on which side of each hyperplane (Support Vector) the feature vector lies. The support vector machine is the resulting classifier.

In some embodiments, a family of Radial Basis Functions is supplied to the grid search of hyperparameters, thus generating a large number (which may be thousands) of individual support vector machines, and one of the support vector machines is chosen. A particular support vector machine is defined by the choice of a particular RBF (or gamma γ), a penalty parameter C, and the set of support vectors generated through training.

Figure 7:
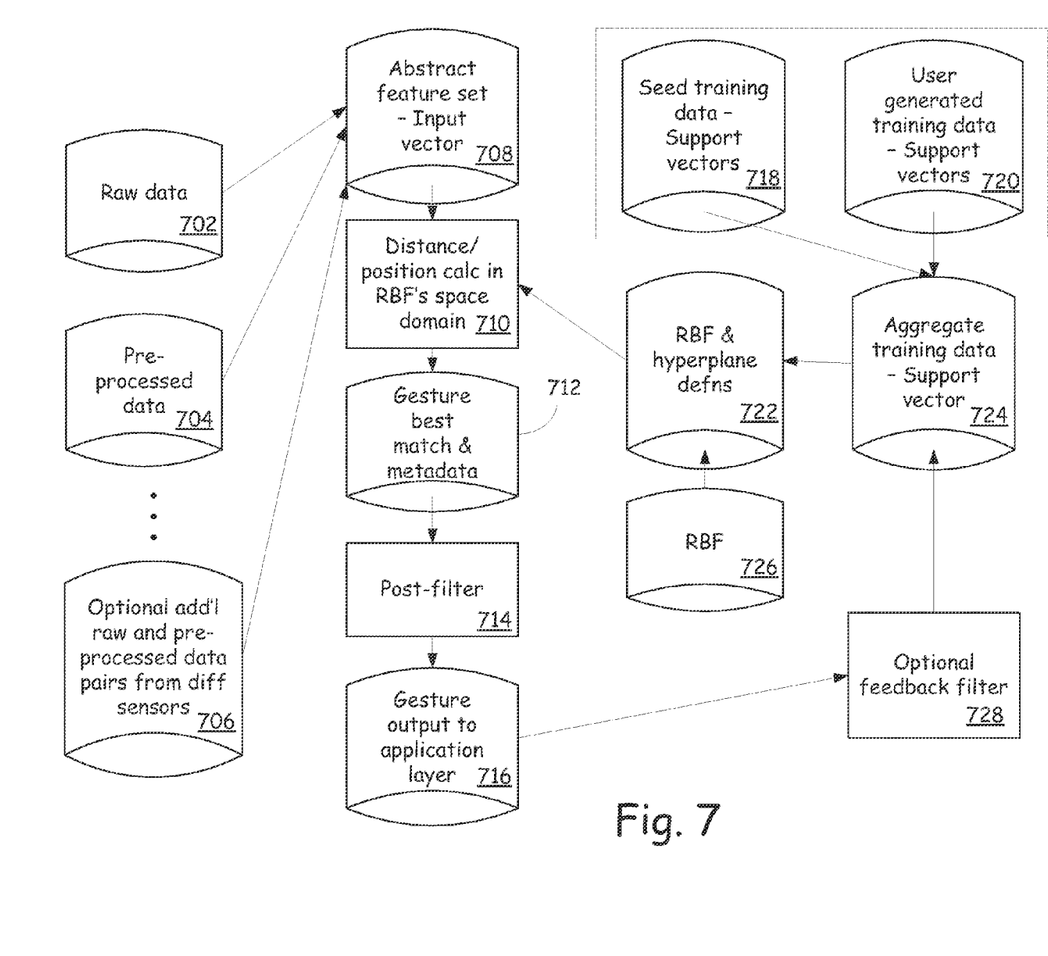
FIG. 7 is an illustration of an embodiment of a process for gesture recognition using a support vector machine.

FIG. 7 is an illustration of an embodiment of a process for gesture recognition using a support vector machine. In some embodiments, touch sensor data such as raw data 702 generated by the touch sensor and pre-processed data 704, such as pre-processed data 340 generated as provided in FIG. 3, is used to generate an input vector comprising an abstract feature set 708 of a gesture input to control a mobile device. In some embodiments, the data may further include additional raw and pre-processed data pairs from different sensors 706. Based on an RBF kernel and support vectors 722, projection of the input vector into feature space 710 results in gesture best match likelihood estimates 712. In some embodiments, a post-filter may be applied to the gesture best match 714, such as requiring a minimum time between gestures (to reduce chances that, for example, a single gesture is interpreted as multiple gestures) with the resulting gesture output to the application layer of the mobile device 716 for operation of the device.

In some embodiments, the RBF and hyperplane definitions are generated based on the RBF 726 and aggregate training data 724, where the aggregate training data 724 may include one or both of seed training data 718 and certain user generated training data 720. In some embodiments, the seed data may be loaded in the factory in the manufacture of a mobile device. User training data may be generated upon a user buying the mobile device and setting up the device for use (and may perhaps be generated rarely thereafter). In some embodiments, the aggregate training data 724 may further include data generated from an optional feedback filter 728 based on gesture output to the application layer 716 to provide for system learning based on detected gestures. In some embodiments, the optional feedback filter 714 is used to improve the gesture recognition on an ongoing basis.

(3) Gesture Recognition Based on Sequence Classification Via Dynamic Time Warping An SVM-based gesture classification algorithm, such as described above, requires the extraction of a set of abstract features from a variable-length time series. In contrast, a sequence classification technique would operate directly on variable-length time series such as the raw velocity and position information available from a touch sensor.

Figure 8:
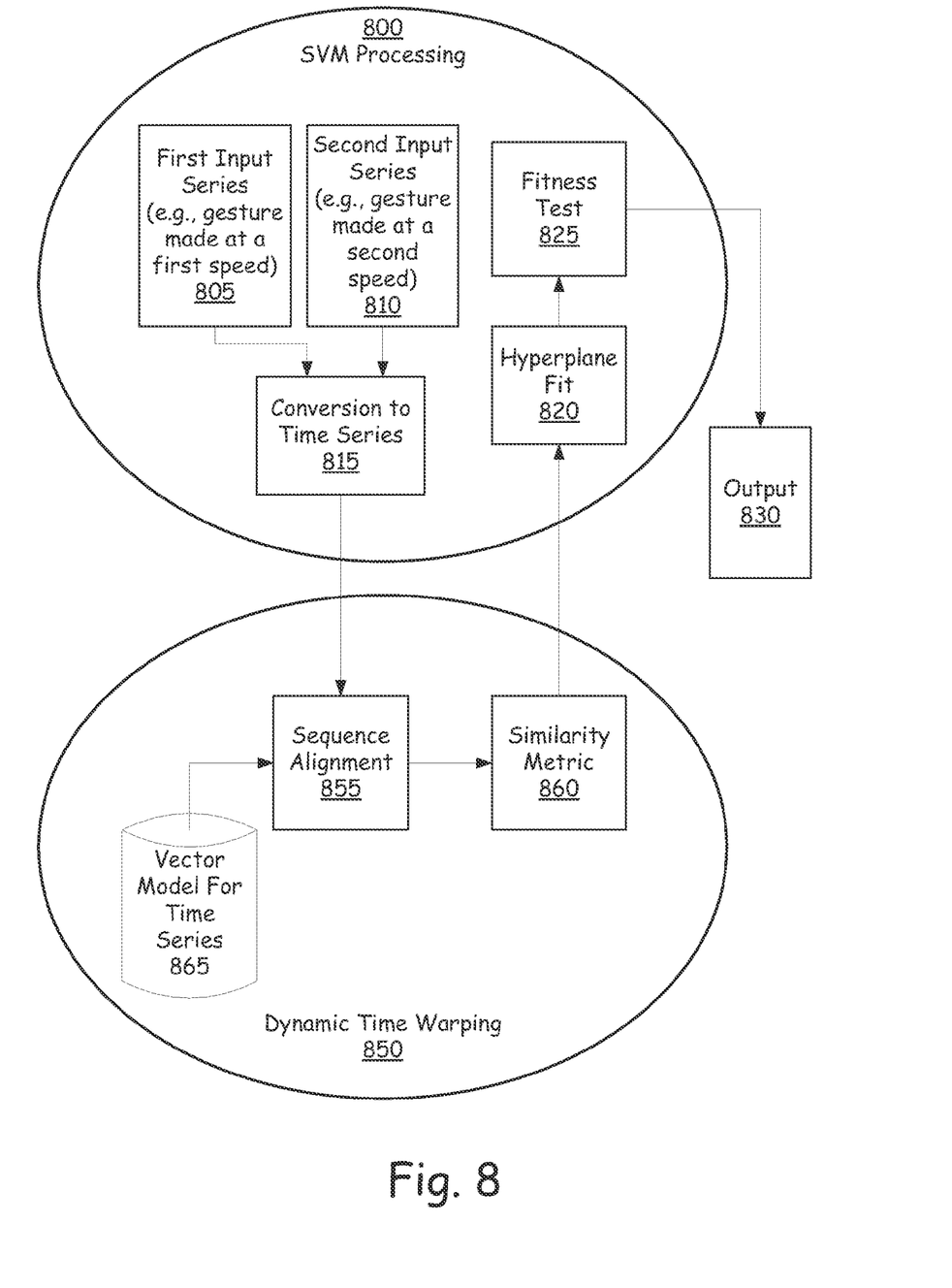
FIG. 8 is an illustration of an embodiment of gesture recognition using dynamic time warping.

In some embodiments, a non-linear sequence alignment method is used to calculate a similarity metric between two arbitrary time series. FIG. 8 is an illustration of an embodiment of gesture recognition using dynamic time warping. In this illustration, in SVM processing 800 a first input series 805 may be gesture performed at a first speed and a second input series 810 may be the same gesture performed at a different second speed. In some embodiments, the first input series 805 and the second input series 810 are converted to time series 815 for dynamic time warping (DTW) 850. In some embodiments, a sequence alignment 855 is conducted utilizing a vector model for a time series 865, resulting in a similarity metric 860. In some embodiments, the results of the similarity calculation are provided for the SVM processing 800 for determination of hyperplane fit 820 and a fitness test 825, which result in the output 830 of the SVM processing 800.

In some embodiments, gesture classification based on sequence alignment allows for discrimination between gestures whose traces over the surface of a touch sensor are similar but whose time-domain orientations differ, such as clockwise and counter-clockwise circular motions or spirals on the sensor surface, while DTW allows gestures made at different speeds to be recognized as belonging to the same class. Further, there is no requirement that there be a set of well-chosen features extracted from the data in order for classification to succeed as there is when using abstract feature extraction.

Dynamic time warping aligns two sequences $X=(\vec{x}_1, \ldots, \vec{x}_i)$ and $Y=(\vec{y}_1, \ldots, \vec{y}_i)$ where $\dim(\vec{x}_1)=\ldots=\dim(\vec{x}_i)=\dim(\vec{y}_1)=\ldots=\dim(\vec{y}_i)$ via quadratic programming. Thus, for a two-dimensional graph G where $\dim(G)=(i,j)$ and whose adjacent entries may be traversed as a temporal path, we define the entries of G as $$G(n, m) = \max \begin{Bmatrix} G(n-1, m) + \vec{x}_n \cdot \vec{y}_m \\ G(n-1, m-1) + 2(\vec{x}_n \cdot \vec{y}_m) \\ G(n, m-1) + \vec{x}_n \cdot \vec{y}_m \end{Bmatrix}$$

and the similarity between X and Y is $$K(X, Y) = \frac{G(i, j)}{i + j}.$$

We may then use this similarity metric as an SVM kernel and proceed as in abstract feature recognition.

Embodiments of pointer control algorithms may be in any number of forms. In some embodiments, the algorithms share a common purpose of providing a transform between the raw sensor data and position/contact/motion on the sensor surface. Some algorithms and sensor combinations are not capable of generating reliable absolute positioning, in which case the absolute positioning output is typically represented as an accumulation of motion, reset when contact is no longer detected, while other algorithms/sensors generate both good absolute and good relative position.

In some embodiments, operations utilize the centroid class of algorithms, as described above, which take a weighted average of a quantity derived from the instantaneous capacitance reported by a sensor multiplied by that sensor's position in space. The resulting quantity is a capacitive barycenter for the thumb, which can either be treated as the absolute position of the thumb or differentiated to provide relative motion information as would a mouse.

The characteristics of a given "centroid" algorithm are largely determined by scaling and/or normalization of the capacitive data prior to averaging. Approaches may include (a) squared deviation from a per-datum capacitive baseline and (b) normalization by automatically calibrated per-sensor minima and maxima. In the former approach, the per-datum capacitive baseline is determined by tracking the minimal value for each sensor, subtracting that from the observed input, and then subtracting the lowest observed sensor level in a given observation from all other observed sensor levels. Treating these as error terms and squaring them prior to averaging has the effect of projecting the sensor coordinate space onto a quadratic surface. In the latter approach, minima and maxima are determined by observing the range of values for each sensor during its operation.

Figure 9:
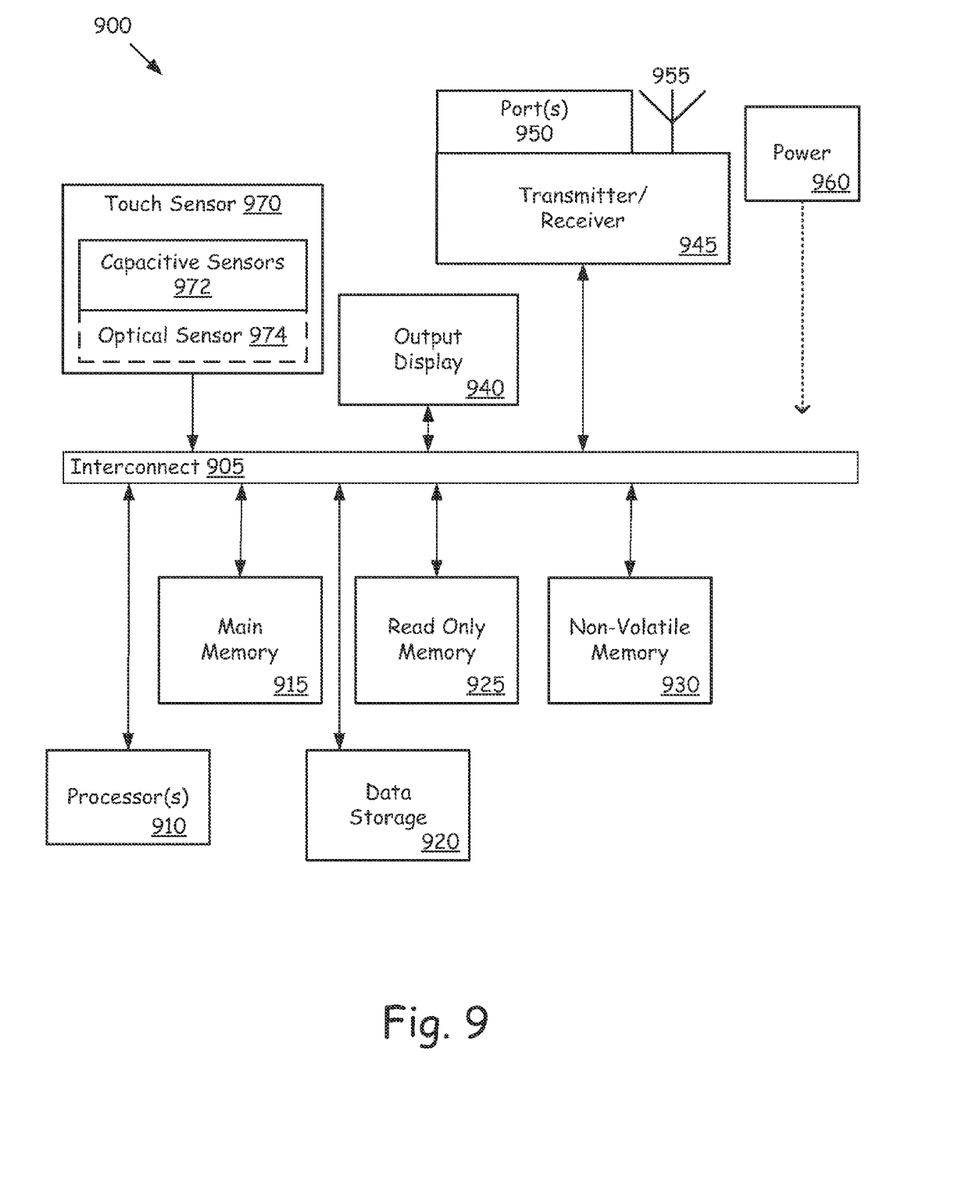
FIG. 9 illustrates an embodiment of a mobile device.

FIG. 9 illustrates an embodiment of a mobile device. In this illustration, certain standard and well-known components that are not germane to the present description are not shown. Under some embodiments, the mobile device 900 comprises an interconnect or crossbar 905 or other communication means for transmission of data. The device 900 may include a processing means such as one or more processors 910 coupled with the interconnect 905 for processing information. The processors 910 may comprise one or more physical processors and one or more logical processors. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers.

In some embodiments, the device 900 further comprises a random access memory (RAM) or other dynamic storage device or element as a main memory 915 for storing information and instructions to be executed by the processors 910. Main memory 915 also may be used for storing data for data streams or sub-streams. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory. The device 900 also may comprise a read only memory (ROM) 925 or other static storage device for storing static information and instructions for the processors 910. The device 900 may include one or more non-volatile memory elements 930 for the storage of certain elements.

Data storage 920 may also be coupled to the interconnect 905 of the device 900 for storing information and instructions. The data storage 920 may include a magnetic disk, an optical disc and its corresponding drive, or other memory device. Such elements may be combined together or may be separate components, and utilize parts of other elements of the device 900.

The device 900 may also be coupled via the interconnect 905 to an output display 940. In some embodiments, the display 940 may include a liquid crystal display (LCD) or any other display technology, for displaying information or content to a user. In some environments, the display 940 may include a touch-screen that is also utilized as at least a part of an input device. In some environments, the display 940 may be or may include an audio device, such as a speaker for providing audio information.

One or more transmitters or receivers 945 may also be coupled to the interconnect 905. In some embodiments, the device 900 may include one or more ports 950 for the reception or transmission of data. The device 900 may further include one or more antennas 955 for the reception of data via radio signals.

The device 900 may also comprise a power device or system 960, which may comprise a power supply, a battery, a solar cell, a fuel cell, or other system or device for providing or generating power. The power provided by the power device or system 960 may be distributed as required to elements of the device 900.

In some embodiments, the device 900 includes a touch sensor 970. In some embodiments, the touch sensor 970 includes a plurality of capacitive sensor pads 972. In some embodiments, the touch sensor 970 may further include another sensor or sensors, such as an optical sensor 974.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A mobile device comprising:
   a touch sensor for the detection of gestures, the touch sensor including a plurality of sensor elements to generate touch sensor data for a first detected gesture performed by a thumb or other finger of a user on the touch sensor; and
   a processor, the processor to process the touch sensor data produced by the sensor elements of the touch sensor to calculate a motion of the first detected gesture;
   wherein the processor is to process the touch sensor data for the first detected gesture using a hybrid touch sensor algorithm, the hybrid touch sensor algorithm including a plurality of touch sensor algorithms to calculate motion of gestures detected by the touch sensor, the plurality of touch sensor algorithms including a first touch sensor algorithm and a second touch sensor algorithm, wherein the processor dynamically changes from utilizing results generated by the first touch sensor algorithm for the first detected gesture to utilizing results generated by the second touch sensor algorithm for the first detected gesture in response to the processor detecting rank skipping between the plurality of sensor elements in data produced by the first touch sensor algorithm for the motion of the first detected gesture;
   wherein the first touch sensor algorithm is a slider algorithm, the first touch sensor algorithm to treat the plurality of sensor elements as being physically arranged in a plurality of sensor ranks located in relation to a first axis, and the second touch sensor algorithm is a centroid algorithm, and wherein detecting rank skipping includes detecting a discontinuity in sensing of sensor rank positions for the calculated motion of the first detected gesture.

2. The mobile device of claim 1, wherein:
   the second touch sensor algorithm is to take a weighted average of quantities derived from the plurality of sensor elements to determine a barycenter of the thumb or other finger of the user performing the first detected gesture.

3. The mobile device of claim 2, wherein the barycenter determined by the second touch sensor algorithm may be used for one of an absolute position of the thumb or other finger of the user or differentiated to provide relative motion information.

4. The mobile device of claim 1, wherein the first touch sensor algorithm is to identify a position on one of the sensor ranks for the first detected gesture.

5. The mobile device of claim 4, wherein determining the sensor rank for the first detected gesture includes locating a distal-most sensor rank meeting a certain threshold.

6. The mobile device of claim 4, wherein the slider algorithm is preferred over the centroid algorithm when a tip of the thumb or other finger of the user is located on an upper portion of the touch sensor.

7. A method comprising:
   receiving touch sensor data for a mobile device, the touch sensor data representing a gesture input for a first detected gesture performed by a thumb or other finger of a user on the touch sensor;
   processing the touch sensor data to calculate a motion of the first detected gesture using a hybrid touch sensor algorithm, the hybrid touch sensor algorithm including a plurality of touch sensor algorithms to calculate motion of gestures detected by the touch sensor, the plurality of touch sensor algorithms including a first touch sensor algorithm and a second touch sensor algorithm; and dynamically changing from utilizing results generated by the first touch sensor algorithm for the first detected gesture to utilizing results generated by the second touch sensor algorithm for the first detected gesture in response to detecting rank skipping between the plurality of sensor elements in data produced by the first touch sensor algorithm for the motion of the first detected gesture;

wherein the first touch sensor algorithm is a slider algorithm, the first touch sensor algorithm to treat the plurality of sensor elements as being physically arranged in a plurality of sensor ranks located in relation to a first axis, and the second touch sensor algorithm is a centroid algorithm, and wherein detecting rank skipping includes detecting a discontinuity in sensing of sensor rank positions for the calculated motion of the first detected gesture.

8. The method of claim 7, wherein:

the second touch sensor algorithm is to take a weighted average of quantities derived from the plurality of sensor elements to determine a barycenter of the thumb or other finger of the user performing the first detected gesture.

9. The method of claim 8, wherein the barycenter determined by the second touch sensor algorithm may be used for one of an absolute position of the thumb or other finger or differentiated to provide relative motion information for the first detected gesture.

10. The method of claim 7, wherein the first touch sensor algorithm is to identify a position on one of the sensor ranks for the first detected gesture.

11. The method of claim 10, wherein determining the sensor rank for the first gesture includes locating a distal-most sensor rank meeting a certain threshold.

12. The method of claim 8, wherein the slider algorithm is preferred over the centroid algorithm when a tip of the thumb or other finger of the user is located on an upper portion of the touch sensor.

13. The mobile device of claim 1, wherein detecting rank skipping includes comparing a derivative for a detected position of the first detected gesture along the first axis for the first touch sensor algorithm with a derivative for a detected position of the first detected gesture along the first axis for the second touch sensor algorithm.

14. The mobile device of claim 13, wherein detecting rank skipping further includes comparing a detected position of the first detected gesture along a second axis, the second axis being perpendicular to the first axis, to an edge of the touch sensor.

15. The method of claim 7, wherein detecting rank skipping includes comparing a derivative for a detected position of the first detected gesture along the axis for the first touch sensor algorithm with a derivative for a detected position of the first detected gesture along the axis for the second touch sensor algorithm.

16. The method of claim 15, wherein detecting rank skipping further includes comparing a detected position of the first detected gesture along a second axis, the second axis being perpendicular to the first axis, to an edge of the touch sensor.

17. The mobile device of claim 1, wherein a position on a second axis, the second axis being perpendicular to the first axis, is a linear transformation between the first touch sensor algorithm and the second touch sensor algorithm.

18. The method of claim 7, wherein a position on a second axis, the second axis being perpendicular to the first axis, is a linear transformation between the first touch sensor algorithm and the second touch sensor algorithm.

\* \* \* \* \*

UNITED STATES PATENT AND TRADEMARK OFFICE
CERTIFICATE OF CORRECTION

PATENT NO. : 9,524,041 B2  
APPLICATION NO. : 13/993057  
DATED : December 20, 2016  
INVENTOR(S) : Phulwani et al.

Page 1 of 1

It is certified that error appears in the above-identified patent and that said Letters Patent is hereby corrected as shown below:

In the Claims

In Column 16, at Line 2, after "first", insert --detected--.

Signed and Sealed this
Twenty-eighth Day of February, 2017

Michelle K. Lee
*Director of the United States Patent and Trademark Office*